Aug. 2, 1966    F. J. ADAMS    3,263,448

UNIVERSAL JOINTS

Filed June 4, 1964

United States Patent Office 3,263,448
Patented August 2, 1966

3,263,448
UNIVERSAL JOINTS
Frederick John Adams, Houghton Regis, England, assignor to Cam Gears Limited, a British company
Filed June 4, 1964, Ser. No. 372,463
Claims priority, application Great Britain, July 23, 1963, 29,097/63
5 Claims. (Cl. 64—21)

This invention relates to constant-speed universal joints such as may be required in transmission systems. There have been many constructions proposed for such joints, but generally speaking they had disadvantages either of complexity, inaccuracy, or expense. The present invention seeks to provide constant-speed universal joints which as well as being accurate, are of simple, robust and economic construction. The invention may also provide joints which can resist tensile or compression loads between the shafts.

The invention will be described in terms of a universal joint between two shaft-ends but is to be understood to be applicable in other analogous circumstances, for example between a spindle and a tool.

Constant velocity universal joints are known. In various prior examples of these, the use of two (and only two) balls, operating with their centres on a common diameter of the joint is known and has the advantage that there is no problem of equating load between one ball and others. In known joints, one shaft is provided with a female end and, in effect, this surrounds the male end of the other shaft. Both shaft ends are provided with grooves which are arcuate in cross-section to fit the balls, and arcuate in their length to afford the required articulation between the shafts. Moreover, in such joints, the balls have been located by caging means of which the location in respect of the shafts is controlled by a bail of which the ends are in universally articulated engagement with each of the shafts and, between its ends, is articularly engaged with the cage, so that the cage and therefore the balls which it locates, upon angular deflection between the shafts, rocks through half such angle.

The invention relates to such joints and improves thereon, in the general sense of simplifying the way in which they can be manufactured (especially as to machining operations), and providing them as robust and reliable structures. Joints according to the invention satisfy the criteria of the automobile industry as regards quality, performance, life, and price, and are regarded as an advance in that very critical industry.

A joint according to the invention is represented illustratively by the drawings in which:

FIGURE 1, in part section (on line B—B of FIGURE 3), shows a joint with the two shafts at maximum angular deflection in one plane;

Figure 3:
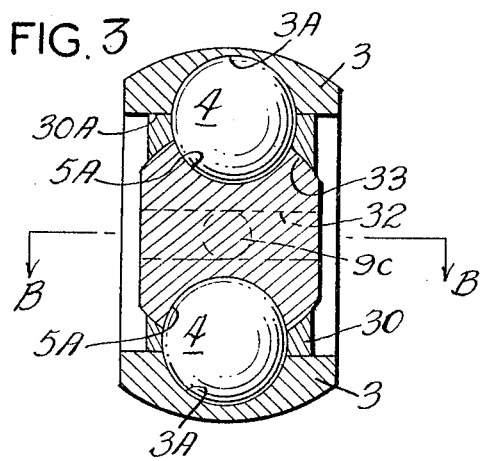
FIGURE 3 shows the joint in section transverse to the axis of the undeflected shafts.
Figure 1:
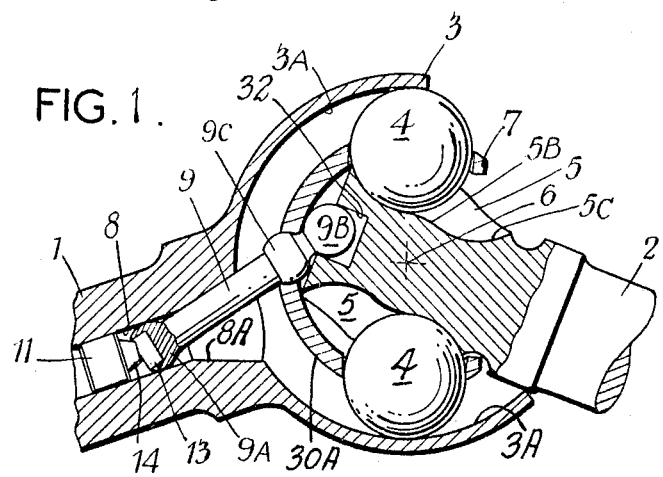

Referring to FIG. 1, shafts are represented at 1 and 2, the respective female and male ends of which are comprised in the joint. Shaft 1 has a fork formed by two partly-spherical fingers 3 diametrically opposed and having internally, arcuate-sectioned grooves 3A forming arcuate tracks for two balls 4. The fingers 3 can be seen in section in FIG. 3 (though this figure is not otherwise a section on FIG. 1).

Shaft 2 has two diametrically opposite channels 5, which are likewise arcuate in cross-section (see 5A in FIG. 3) to track the two balls 4; and these channels 5 have their floors profiled as seen in FIG. 1, so that a median region indicated at 5B is convexly centred on a centre-point indicated at 6 whilst to each end, the floors of the channels 5 are outwardly turned as at 5C so as to correspond with the balls thereby limiting the angle which the shafts 1 and 2 can make about the centre 6. The centre 6 at all times lies on the axes of both shafts 1 and 2.

The balls 4 are caged in holes in a caging element 7, which is concentric with centre 6 and which partially encloses the end of shaft 2. The internal shape of the element 7, at 33, is best understood by regarding it as being formed out of a sphere; it is in fact a part-annular or horse-shoe shaped element (centred at 6) with a cylindrically profiled convex external surface, at 30A bearing in complementary cylindrical concave surfaces formed in the fingers 3; the spherically profiled concave inner surfaces 33 bearing on complementary spherically convex surfaces of the end of shaft 2. The element 7 is thus capable of angular movement, about centre 6, with respect to both the shaft ends. The cylindrical bearing (30A) permits relative angular movement in the plane of the track 3A, and the spherical bearing (33) permits angular movement about an axis which is the diameter upon which the centres of the balls 4 lie.

Figure 2:
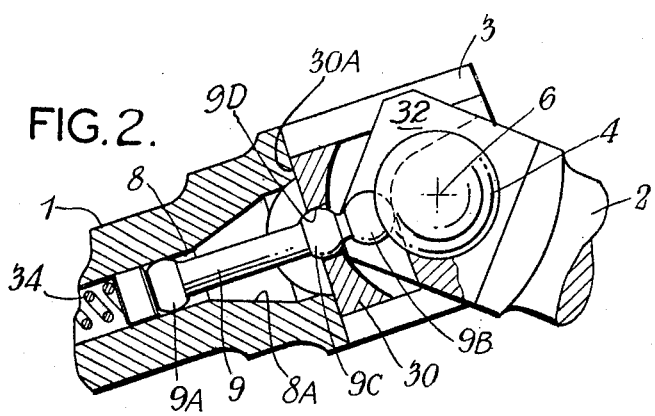
FIGURE 2 shows the joint at maximum angular deflection in a plane at 90° to that of FIGURE 1.

The end of shaft 1 has a coaxial bore 8 with a bell-like enlarged opening at 8A. Within the bore 8 is axially slidable and articulated, the spherical end 9A of a bail 9. The other spherical end 9B of the bail 9 is engaged articularly and slidably in a slot 32 formed in the end of shaft 2. This slot 32 is diametral (as can best be seen in broken line in FIGURE 3) and its floor is arcuate about the centre 6 at least through the maximum deflection angle of the joint; this arcuate formation is best seen in FIGURE 2. The slot lies, effectively, in a plane at right angles to the plane of the track 3A. Where the bail 9 passes through an axial hole 9D in the cage element 7 there is a third spherical formation 9C on the bail 9. The centre of the end 9B is spaced, as seen from centre 6, along the axis of shaft 2. As can be seen from FIG. 1, when the shafts 1 and 2 are angularly displaced in the plane of the tracks 3A, the bail 9 is constrained to take up an angular position with respect to the axes of both shafts 1 and 2 and in so doing, moves the caging element 7 (in its cylindrical bearing) angularly about centre 6. The proportions and dimensions of the bail, and especially the axial spacing of the centres of parts 9B and 9C from the centres 6, are so selected that the balls 4 are located by the cage 7, in the track 3A, always with their centres on a diameter which (a) is intersecting the axes of the shafts 1 and 2, i.e. at centre 6 and (b) in all angular positions of the shafts 1 and 2, is always at equal angles to the shaft axes. The balls 4 therefore, are constrained by the element 7 so that they transmit torque (through the walls of their grooves or channels) between the shafts without changes of relative angular speed as between the shafts.

The angular movements of the bail 9 necessarily entails some axial movement relative to one or both shaft ends. As seen in FIG. 1, a fixed stop as at 11 may be provided. In this case, the bail 9 is located endwise by the device shown, in which the bail end 9A has a circular recess 13 which engages a frustoconical part 14 provided on the stop 11. The geometry of this structure, as can be seen, results in the bail 9 being moved to the right (in the drawings) as the joint is deflected, the edge of recess 13 riding up the part 14.

In FIG. 2, the stop 11 against which bears the bail end 9A is movable axially (with the end 9A) within the shaft 1, and the stop (and therefore the bail) is urged by a compression spring 34 always towards shaft 2. Such spring loading can serve the useful purpose of keeping the assembly of the joint always under some load, so that "chatter" due to working clearances, is eliminated or controlled. For this and other reasons, the construction of FIGURE 2 is preferred to that of FIGURE 1, especially for high duty joints such as are required in automobiles.

Although the shaft-end 5 is illustrated as having outwardly curved ends 5C to its grooves, this is inessential; it is expedient, however, for forming them by a spherical ended milling cutter. Obviously at least its extreme portion, as at 5C, may be cut off or omitted if other manufacturing steps are chosen.

I claim:

1. Constant-speed universal joint comprising first and second shaft ends having complementary concentric arcuate tracks formed respectively inside and outside them, a single pair of balls to transmit torque between said shaft ends by engaging said tracks, a cage element engaging and adapted to locate said balls always with their centres on a common diameter of the joint passing through the common arc centre of said tracks, a bail articularly engaged in the first shaft end, articularly engaged in the second shaft end, and articularly engaged in said cage element and free to slide diametrically in one of said articular engagements, said cage element having a cylindrical bearing with one of said shafts and a spherical bearing with the other of said shafts the axes of both such bearings intersecting said centre and the axis of said cylindrical bearing being parallel with the diameter in which said bail is slidable.

2. Universial joint according to claim 1 in which the end of said second shaft is so shaped as to define a diametrically-directed slot to receive the corresponding bail end articularly and slidably.

3. Universal joint according to claim 1 in which means are provided in said first shaft to urge said bail towards said second shaft.

4. Universal joint according to claim 1 in which the ball-receiving track of said second shaft is defined by outwardly-turned sectional profiles forming limits to the movement of the balls in said track.

5. Universal joint according to claim 1 in which the first shaft has an axial bore to receive the corresponding bail end, there being a stop slidable in said bore and a compression spring urging said stop into constant axially loaded engagement with the bail.

References Cited by the Examiner

UNITED STATES PATENTS

| | | | |
|---|---|---|---|
| 1,916,442 | 7/1933 | Rzeppa | 64—21 |
| 1,975,758 | 10/1934 | Stuber | 64—21 |
| 2,010,899 | 8/1935 | Rzeppa | 64—21 |
| 2,427,237 | 9/1947 | Suczek | 64—21 |
| 2,432,216 | 12/1947 | Suczek | 64—21 |
| 2,579,356 | 12/1951 | Anderson | 64—21 |

FOREIGN PATENTS 543,849   5/1956   Italy.

FRED C. MATTERN, JR., *Primary Examiner.*

HALL C. COE, *Examiner.*